(12) United States Patent (10) Patent No.: US 12,680,764 B2

Honary (45) Date of Patent: Jul. 14, 2026

---

(54) WATERLESS GREASE COOLING SYSTEM

(71) Applicant: WAVEtek Process Technology, LLC, Grundy Center, IA (US)

(72) Inventor: Lou A. T. Honary, Cedar Falls, IA (US)

(73) Assignee: WAVETEK PROCESS TECHNOLOGY, LLC, Grundy Center, IA (US)

( * ) Notice: Subject to any disclaimer, the term of this patent is extended or adjusted under 35 U.S.C. 154(b) by 188 days.

(21) Appl. No.: 18/654,981

(22) Filed: May 3, 2024

(65) Prior Publication Data

US 2024/0369307 A1 Nov. 7, 2024

Related U.S. Application Data

(60) Provisional application No. 63/499,774, filed on May 3, 2023.

(51) Int. Cl.
| | |
|---|---|
| *F28D 19/04* | (2006.01) |
| *B65G 33/14* | (2006.01) |
| *F28F 13/12* | (2006.01) |

(52) U.S. Cl.
CPC ............ *F28D 19/04* (2013.01); *F28F 13/125* (2013.01); *B65G 33/14* (2013.01)

(58) Field of Classification Search
CPC .......... F28D 19/04; F28F 13/125; F28F 5/06; B65G 33/14; B65G 69/20; B01J 2219/00123; F16N 39/02
USPC ........................................... 165/10
See application file for complete search history.

(56) References Cited

U.S. PATENT DOCUMENTS

| | | | | | |
|---|---|---|---|---|---|
| 2,592,783 | A | * | 4/1952 | Aspegren | F28C 3/18 |
| | | | | | 34/142 |
| 2,872,386 | A | * | 2/1959 | Aspegren | B01J 19/28 |
| | | | | | 202/136 |
| 3,401,923 | A | * | 9/1968 | Bearce | F26B 11/0413 |
| | | | | | 432/27 |
| 4,353,725 | A | * | 10/1982 | Hohman | C03B 3/023 |
| | | | | | 65/134.8 |
| 4,474,553 | A | * | 10/1984 | Takahashi | F28C 3/18 |
| | | | | | 432/27 |
| 4,862,601 | A | * | 9/1989 | Baillie | F26B 3/205 |
| | | | | | 432/154 |
| 4,875,820 | A | * | 10/1989 | Lepp | B65G 33/32 |
| | | | | | 198/615 |

(Continued)

FOREIGN PATENT DOCUMENTS

| | | | | | |
|---|---|---|---|---|---|
| CN | 220707826 | U | * | 4/2024 | |
| CN | 117964941 | A | * | 5/2024 | ............... C08L 23/22 |
| CN | 220999749 | U | * | 5/2024 | |

*Primary Examiner* — Jon T. Schermerhorn, Jr.

(74) *Attorney, Agent, or Firm* — SHUTTLEWORTH & INGERSOLL, PLC; Brett D. Papendick

(57) ABSTRACT

A system for cooling grease without requiring water. The system utilizes metal balls that are systematically fed into a passageway containing grease at a certain temperature. The steel balls can be cooled to a set temperature before being introduced into the passageway and the grease. A certain amount of the cooled grease adheres to the periphery of the steel balls. The adhered grease is then removed by a ball wiper. A second embodiment of the invention utilizes cooled steel rods to cool grease in a grease chamber.

8 Claims, 12 Drawing Sheets

(56)         References Cited

U.S. PATENT DOCUMENTS

| | | | | |
|---|---|---|---|---|
| 5,750,255 | A * | 5/1998 | Yoshida | C03C 1/02 |
| | | | | 110/224 |
| 5,802,961 | A * | 9/1998 | Hay | A23B 7/0053 |
| | | | | 366/136 |
| 6,706,199 | B2 * | 3/2004 | Winter | C10J 3/485 |
| | | | | 48/DIG. 2 |
| 7,574,816 | B2 * | 8/2009 | Shivvers | F26B 3/205 |
| | | | | 34/418 |
| 11,542,435 | B2 * | 1/2023 | Neville | C10B 57/14 |
| 11,555,445 | B2 * | 1/2023 | Petersen | F02B 77/04 |
| 11,827,466 | B2 * | 11/2023 | DeWind | B65G 33/34 |
| 2018/0017323 | A1 * | 1/2018 | Whitney | F26B 25/06 |

* cited by examiner

WATERLESS GREASE COOLING SYSTEM

CROSS-REFERENCE TO RELATED APPLICATIONS

The present application claims priority to provisional patent application 63/499,774 which was filed on May 3, 2023, and is hereby expressly incorporated by reference in its entirety.

BACKGROUND OF THE INVENTION

Grease is a semi-solid mixture of soap and oil. Greases require reaction heating up to 200 to 230 degrees Centigrade. Grease cooling or quenching refers to the cooling of grease after the reaction process is completed. Quenching impacts the quality and the yield of a grease. A grease that is cooled quickly creates harder soap structures and subsequently a higher yield as more oil is needed to thin it to the desired consistency (grade). Slow cooling results in a softer grease and subsequently lower yield. For quenching to be effective, preferably an 80 to 100 degrees Centigrade temperature drop would be needed within a short period of time after the reaction is completed.

Current grease manufacturers rely on cooling towers and chillers to cool the grease in jacketed vessels. Cooling water is pumped into the jacket of a vessel to cool its inside walls. Scrape surface mixers wipe the wall surface of the vessel. Grease is a poor conductor of heat and scraping the walls of the vessel only replaces thin layers of grease that are in contact with wall surfaces. Additionally, vessels that have scrape surface mixers require heavy mix arms, gear reducers and high-powered motors to operate.

The use of water for cooling industrial processes is an old concept started in the early twentieth century. Considered abundant and inexpensive, the use of water as a cooling medium has become ubiquitous across many industries. Sophisticated compressors, antifreeze, anti-rust and anti-corrosion chemicals have been developed in support of water-based cooling systems.

Research has shown that relative to many solids, water is not an effective absorber of heat. For example, a 3" diameter steel ball would weigh 1.6 Kg and would take up only one-fifth as much space as 1.6 Kg of water. A steel ball, as described above, can absorb heat from a heat source much faster than the same mass of water. Similarly, in another embodiment shown in FIGS. 5-7, a 4" stainless steel shaft that is 11.75" in length would weigh 42.6 pounds (19.36 Kg) or 5.435 gallons of water or 55.33 pounds of grease. In contrast a 5.5" stainless steel shaft 7.7 Ft in length would weigh 628 lbs (285.5 kg) equal to 78.5 gallons of water or 81.6 gallons of grease. In most cases the metal cooling component would need to be exposed to the grease enough time to absorb the maximum amount of heat possible.

Steel cooling components could be dipped into the product to be cooled; in yet another embodiment, could be rolled on the product on a flat surface (See FIG. 9-11), or could be dropped into any shape conduit filled with the product to be cooled (See FIG. 8). For this invention a spherical metal object is used in a carefully controlled product transfer auger that allows the metallic object absorb all the heat it can within a time period that is dependent on the heat absorption capacity of the metal used.

SUMMARY OF THE INVENTION

This invention eliminates the need for cooling water and jacketed vessels with scrape surface mixing mechanisms. It relies on solid re-useable metal, preferably, steel balls for cooling grease from the reaction temperature to its desired quenched temperatures which is around 60-80 degrees Centigrade. Simply explained, a predetermined number of steel balls whose aggregate mass equals ¾ to ½ of the mass of the hot grease are introduced into the grease at carefully timed intervals.

The exposure time of each ball to the grease is timed to allow full saturation of heat. During the exposure time a volume of the grease is in contact with the ball is cooled to the desired temperature while the ball is heated to its maximum heat absorption capacity. A special wiper design wipes the grease off each ball at the end of its exposure time and the ball is transferred into a holding vessel to allow for heat exchange and heat removal. Accompanying components include augers, indexing valves for proper timing of the release of each ball into the hot grease and its removal from the grease.

DESCRIPTION OF THE INVENTION

Figure 1:
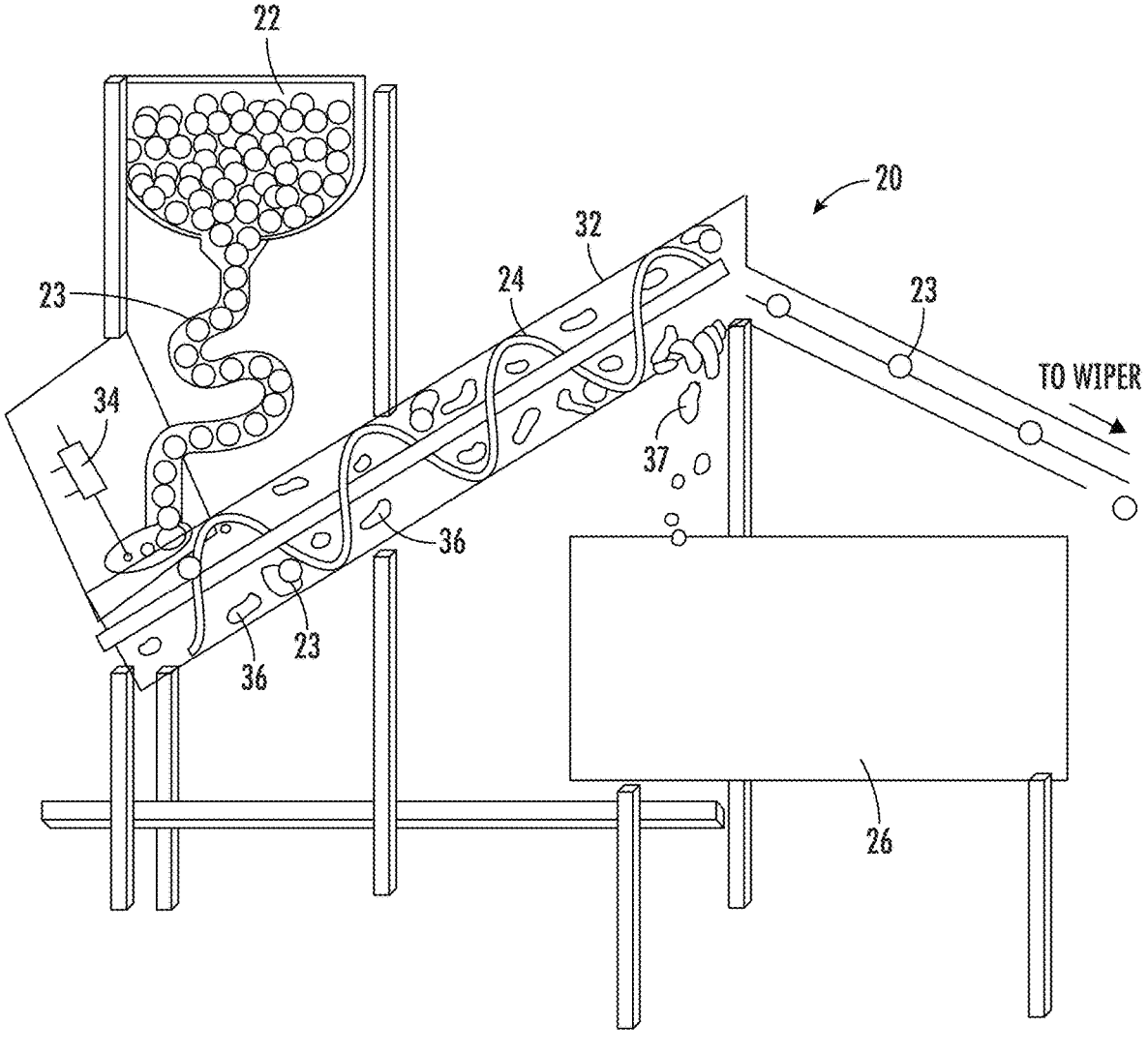
FIG. 1 is a perspective view of a waterless grease cooling system.
Figure 2:
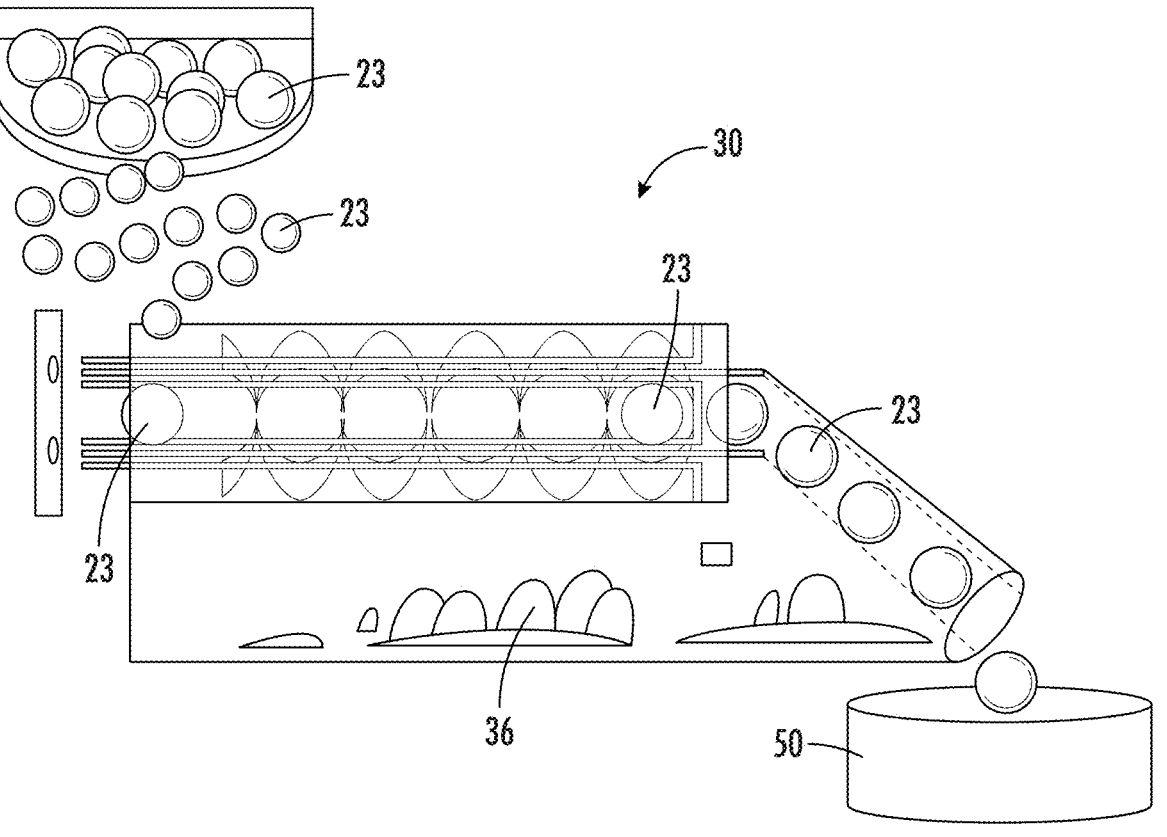
FIG. 2 is a front view of a steel ball wiper of the waterless grease cooling system.
Figure 3:
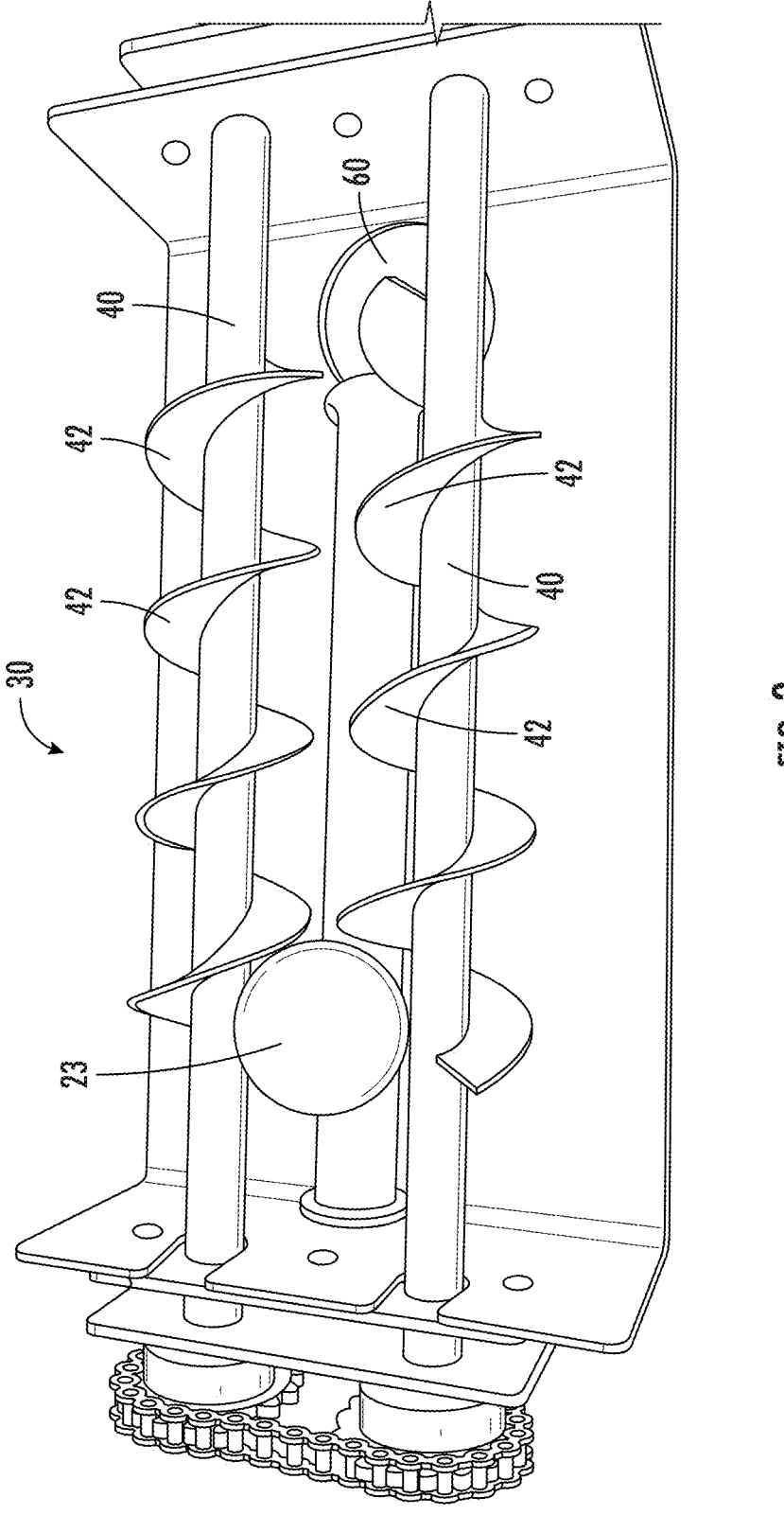
FIG. 3 is a perspective view of the steel ball wiper.
Figure 4A:
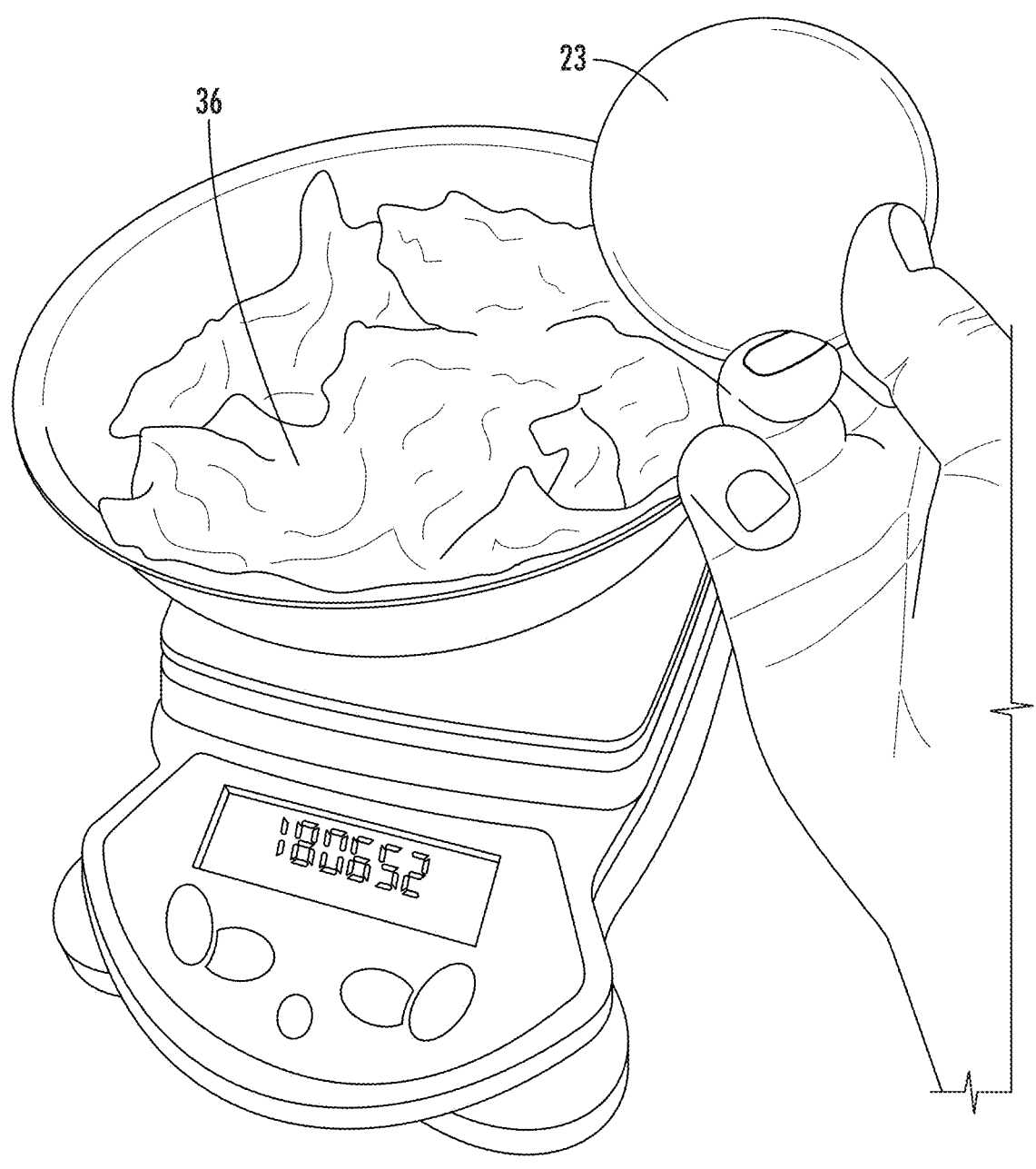
FIGS. 4a-4c are perspective views showing a comparison of the mass of a steel ball compared to the same mass of a grease.
Figure 4B:
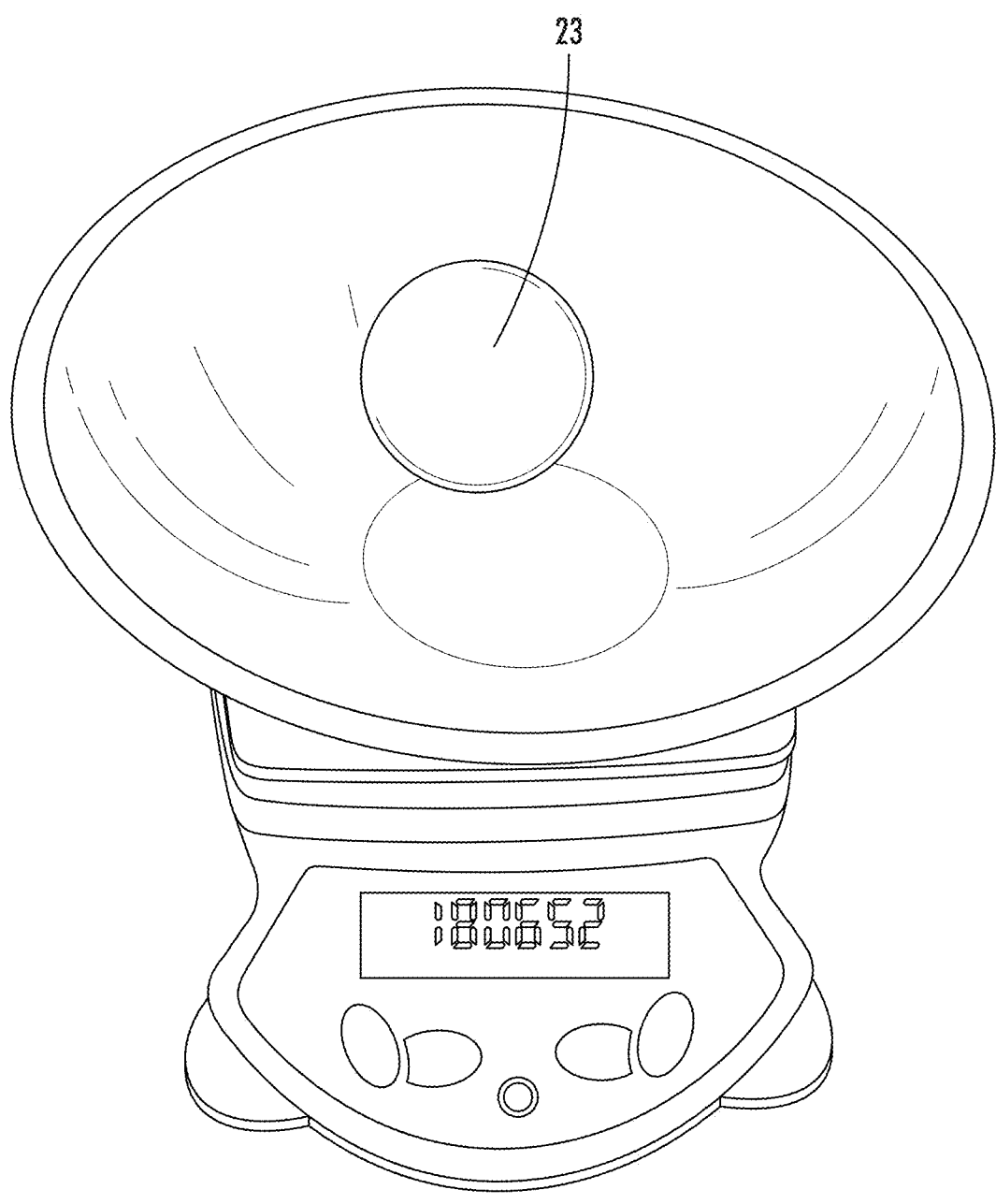
Figure 4C:
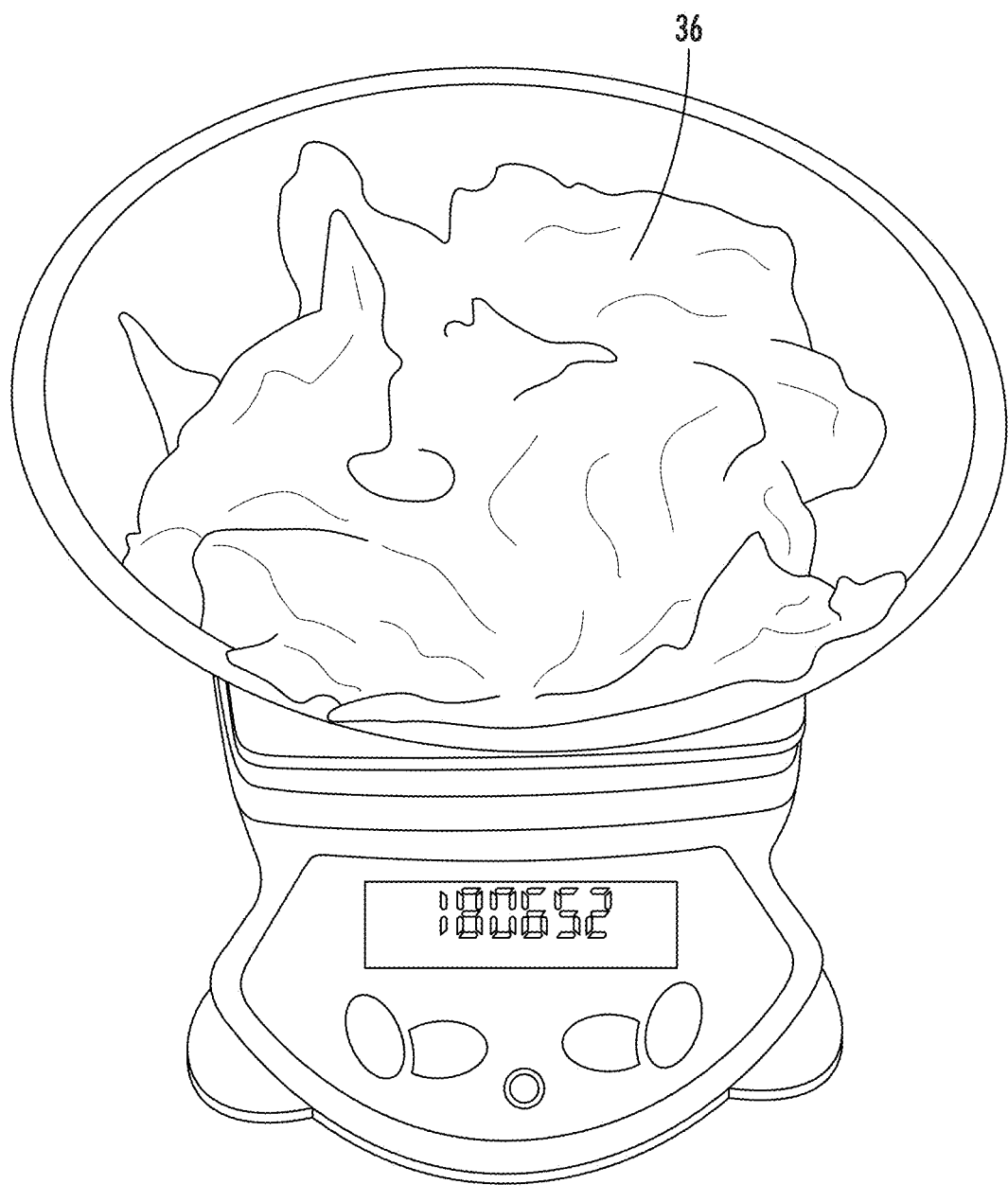

A waterless grease cooling system 20 is shown in FIGS. 1-3. The system 20 preferably comprises a steel ball feeder 22, at least one steel ball 23, a speed controlled auger 24, a holding tank 26, and a steel ball wiper 30.

As shown specifically in FIG. 1, a plurality of steel balls 23 are held in a steel ball feeder 22. The balls 23 are preferably cooled to a specific temperature depending on the type of grease utilized and the temperature of the grease. As hot grease 36 flows through a passageway 32 containing a speed controlled auger 24, the balls 23 are dropped into the passageway 32. The rate of the addition of the steel balls 23 is calculated and a controller 34 systematically drops the steel balls 23 into the passageway 32. The dropping of the steel balls can be controlled and calculated, again depending on the type and temperature of the hot grease 36.

The auger 24 carries the hot grease 36 and the steel balls 23 toward the holding tank 26. In the passageway 32, the hot grease 36 is cooled by the steel balls 23. Upon reaching the end of the passageway 32, a portion of cooled grease 37 adheres to the steel balls 23. A portion of the cooled grease 37 that is not adhered to the steel balls falls through an opening in the passageway 32 and is directed into the holding tank 26, while the steel balls 23 with the cool grease 37 on them are directed to a ball wiper 30.

As shown in FIGS. 2 and 3, the ball wiper 30 functions to remove cool grease 37 that has adhered to the steel balls 23 from the steel balls 23. FIG. 3 shows one way of removing the cooled grease 37 and utilizes a removal auger 40. A steel ball 23 enters the ball wiper 30 and the flighting 42 of the auger 40 are sized such that they make contact with the periphery of each of the steel balls 23 entering the ball wiper 30 and remove the cooled grease 37 from the steel balls 23. The clean steel balls 23 can be transferred out of the ball wiper 30 via an opening 60 to a cooling tank 50 to allow for heat exchange and heat removal. Once properly cooled, the steel balls 23 can be utilized again. It is to be understood that the ball wiper 30 could be part of the passageway 32 and that the cooled grease that is adhered to the steel balls 23 would be wiped clean and exit the same opening as grease that did not adhere to the steel balls 23. The clean steel balls 23 could then exit the passageway to the cooling tank 50.

Figure 5:
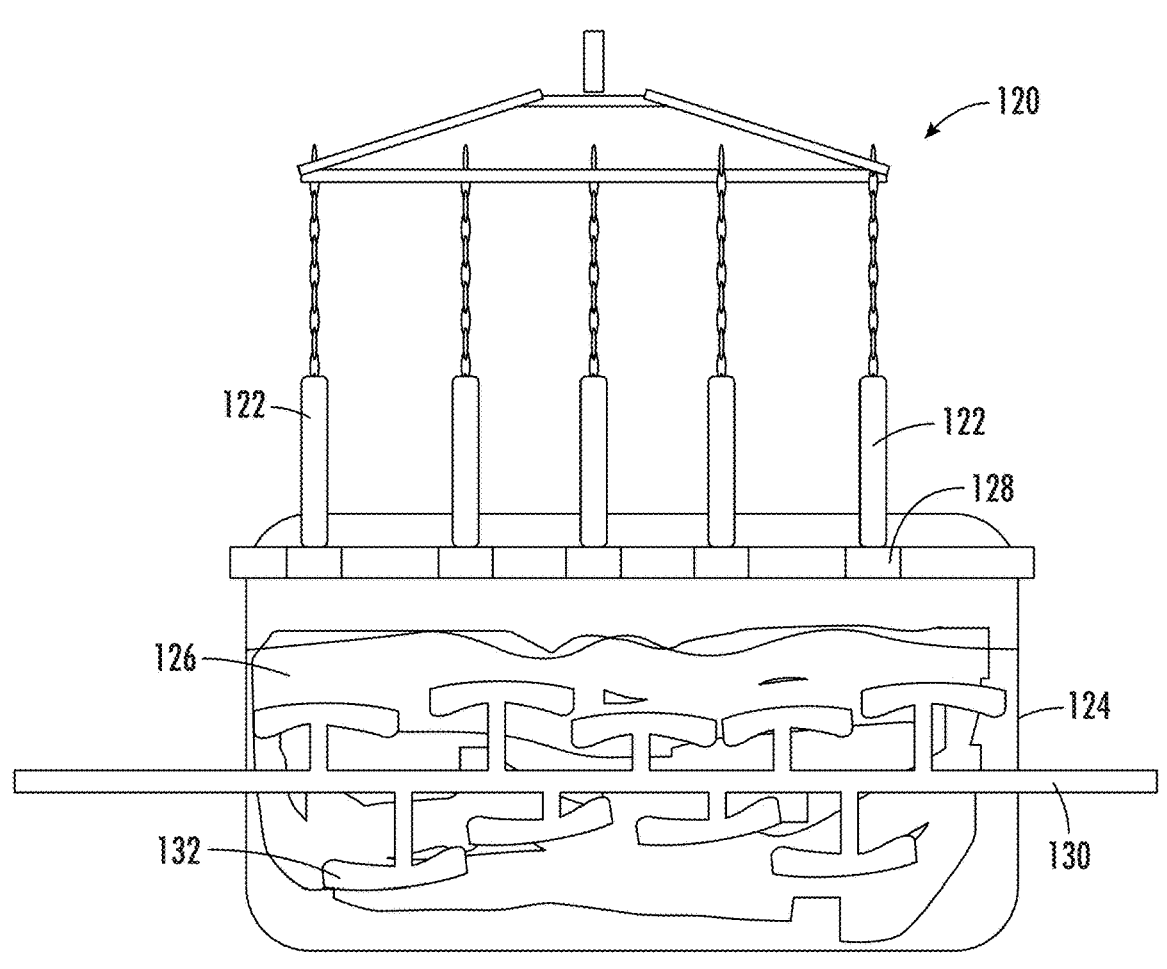
FIG. 5 is a front view of a second embodiment of the invention showing steel rods outside a grease chamber.
Figure 6:
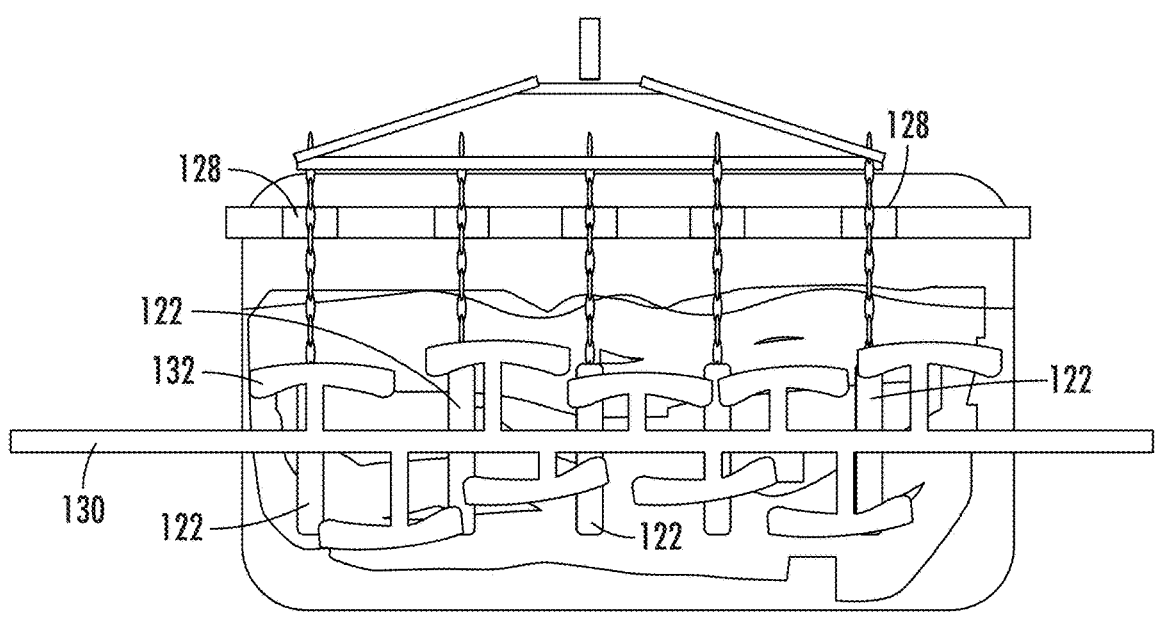
FIG. 6 is a front view of the second embodiment showing the steel rods inserted into the grease chamber.
Figure 7:
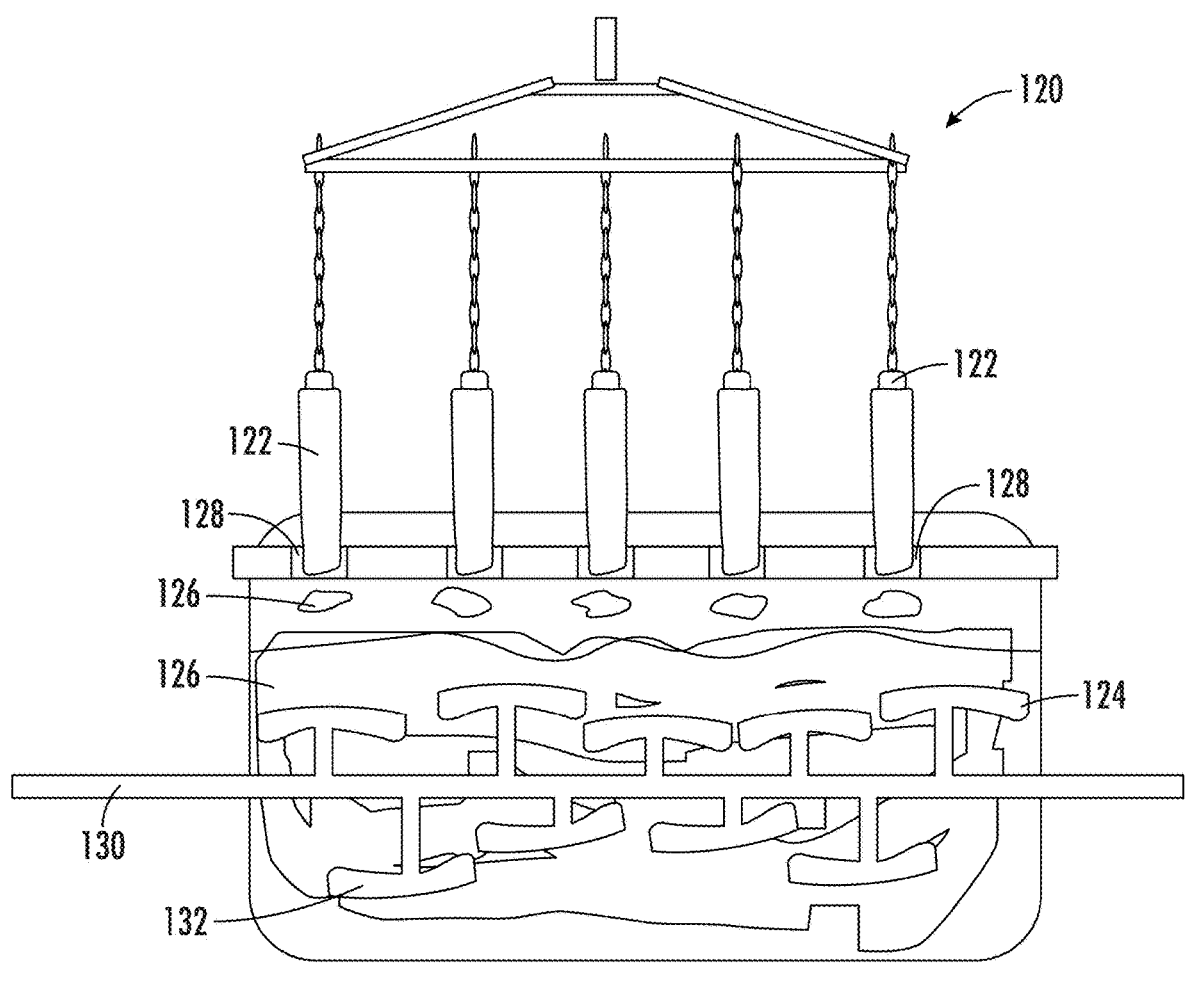
FIG. 7 is a front view of the steel rods being taken out of the grease chamber having just been wiped by the wipers.
Figure 8:
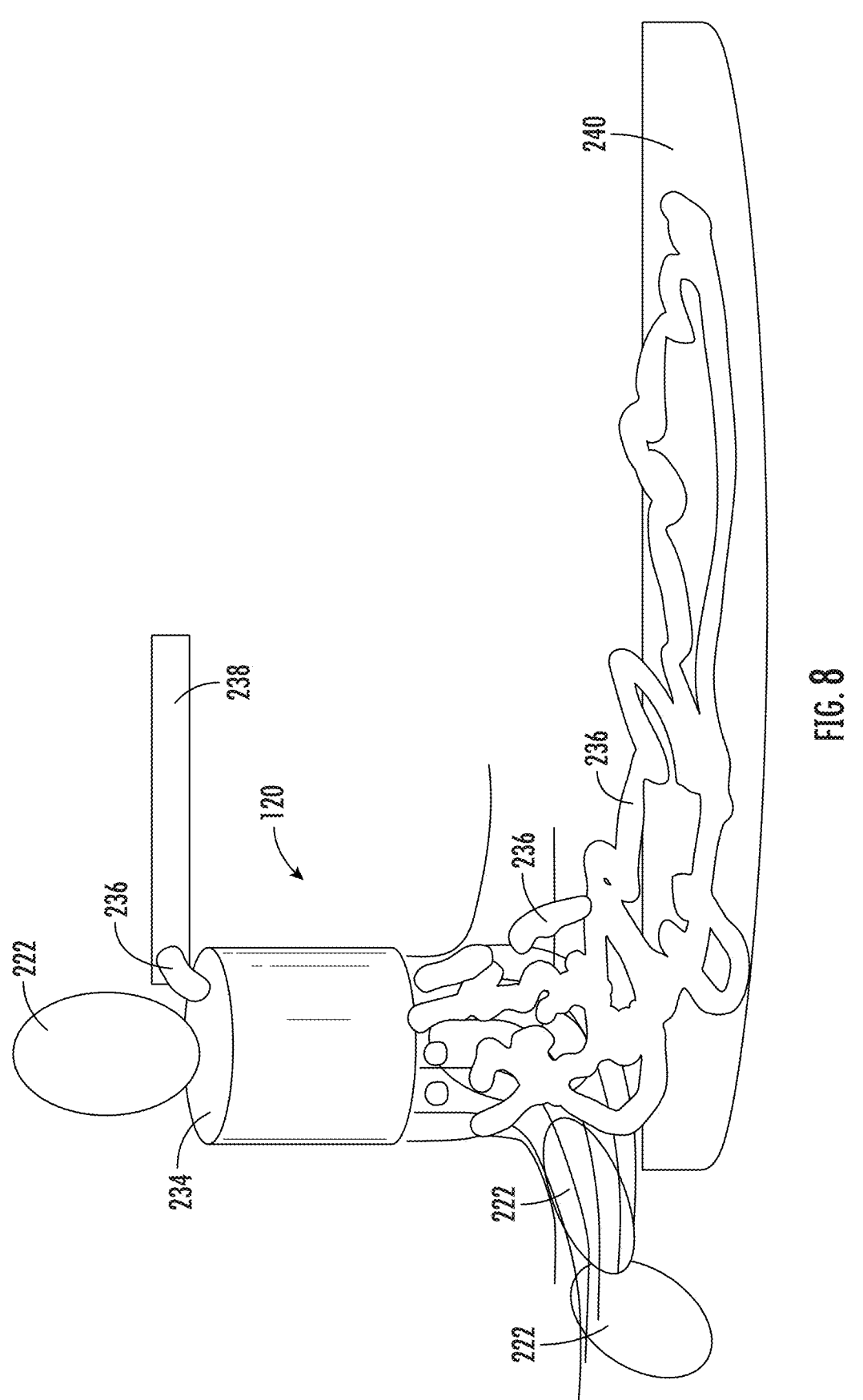
FIG. 8 is a perspective view of a third embodiment of the invention showing a different shape to the steel or metal used in the cooling process of the grease.

A second embodiment 120 of the invention is shown in FIGS. 5-7. In this embodiment, a plurality of metal rods 122, preferably steel, are lowered into a grease chamber 124 holding a quantity of grease 126. After the rods 122 are lowered into the grease 126 and the grease is cooled to a desired temperature, the rods 122 are raised out of the grease 126. As the rods 122 exit the grease chamber 124, wipers 128 make contact with the outside of the rods 122 and wipe of grease 126 that has been attached to the rods 122.

Figure 9:
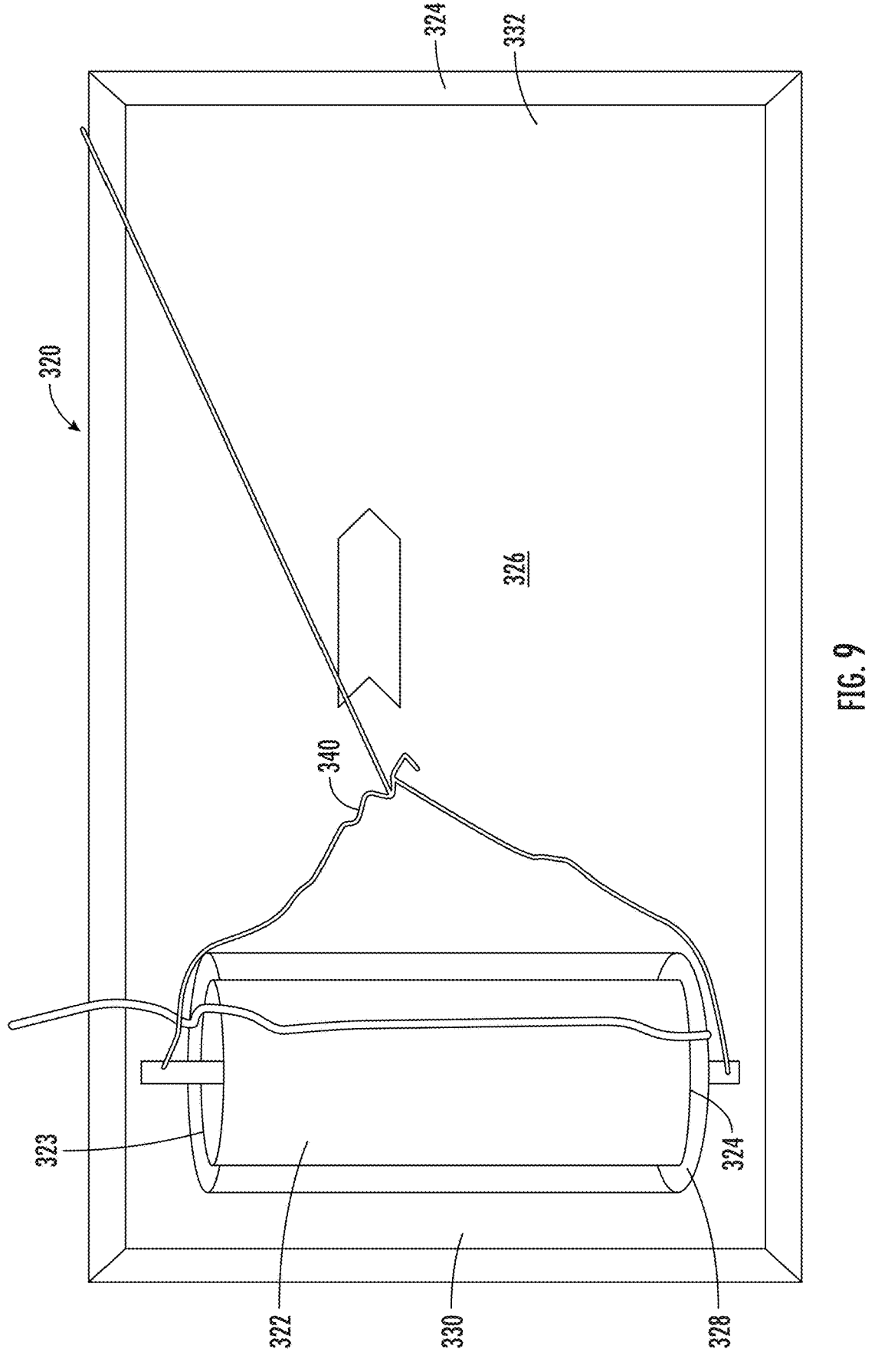
FIG. 9 is a perspective view of a fourth embodiment of the invention showing a steel rod on a plate of grease.

FIG. 9 shows a third embodiment 220 wherein different shaped metal objects 222 are utilized in place of steel spheres. The metal objects 222 are cooled and are combined with grease 236 in a passageway 234. The grease 236 is supplied from a supply tube 238. The passageway 234 can be any length. As the grease 236 and the metal objects 222 travel the length of the passageway 234, the metal objects 222 exit in a first direction while the grease 236 is collected in a container 240.

Figure 10:
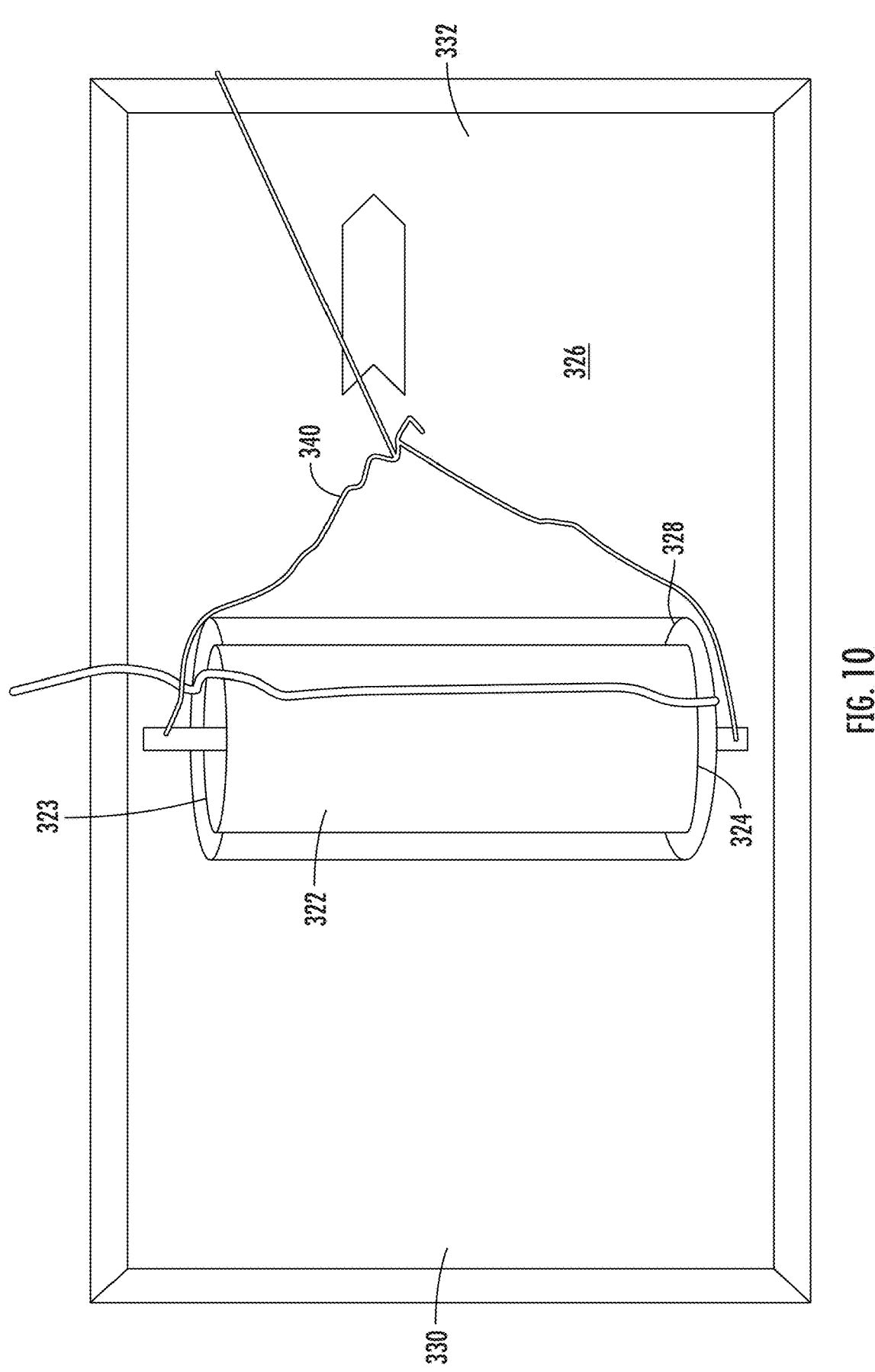
FIG. 10 is a perspective view of the fourth embodiment showing the direction of the steel rod's movement on the plate of grease.
Figure 11:
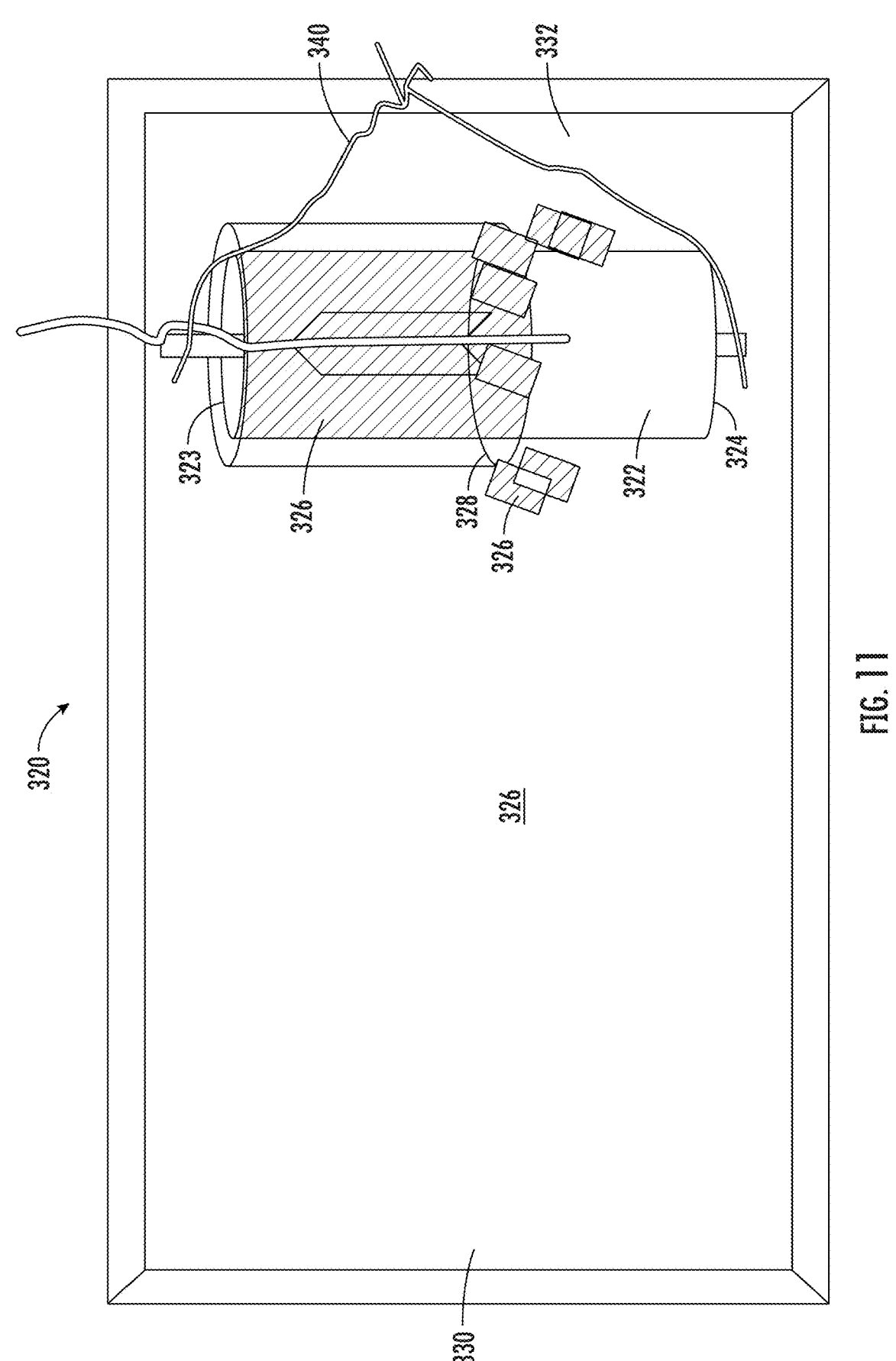
FIG. 11 is a perspective view of the fourth embodiment showing the wiper wiping the steel rod.

FIGS. 9-11 show a fourth embodiment 320 of the invention wherein a cooled metal rod 322 is placed on a plate 324 containing grease 326. The rod 322 is moved over the plate 324 and contacts the grease 326. The rod 322 can be pulled over the grease by a variety of known mechanisms, while a simple cord 340 is show in the figures. Additionally, the rod 322 can rotate as it is pulled from a first side 330 of the plate 324 toward a second side 332 of the plate 324. The arrows show the direction of the movement of the rod 322. Once the rod 322 reaches the second end 332 of the plate 324, a wiper 328 is activated by a second cord 350. As shown in FIG. 11, the wiper 328 is activated and removes excess grease 326 that has cooled on the rod 322. The wiper 325 makes contact with the periphery of the rod 322 in order to remove the grease 326 from the rod 322. The wiper 325 can move back and forth between a first end 323 of the rod 322 to a second end 324 of the rod 322. The cooled grease 326 can be directed to a holding tank (not shown) or back onto the plate 324.

Having thus described the invention in connection with the several embodiments thereof, it will be evident to those skilled in the art that various revisions can be made to the several embodiments described herein without departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments

What is claimed is:

1. A system for waterless cooling of grease, comprising:
a plurality of metal objects;
a passageway;
a feeder for feeding the metal objects into the passageway;
an auger in the passageway configured to move the metal objects and grease along the passageway;
a holding tank; and
a ball wiper;
wherein the plurality of metal objects are selectively introduced into the passageway;
wherein the plurality of metal objects are configured to cool the grease introduced into the passageway;
wherein the plurality of metal objects are configured to allow a portion of the cooled grease to adhere to a periphery of each of the plurality of metal objects as they move along the passageway;
wherein the auger is configured to move the metal objects to an end of the passageway where the metal objects are directed to the ball wiper and the cooled grease that is not adhered to the metal objects is directed to the holding tank; and
wherein the ball wiper is configured to separate the adhered grease from each of the plurality of metal objects.

2. The system of claim 1, wherein:
the plurality of metal objects are made of steel.

3. The system of claim 1, wherein:
the plurality of metal objects are steel balls.

4. The system of claim 1, wherein the auger rotates in the passageway.

5. The system of claim 1, further comprising:
a controller;
wherein the controller is configured to selectively drop the metal objects into the passageway at a predetermined rate.

6. The system of claim 1,
wherein the separated grease is directed to the holding tank.

7. The system of claim 3 wherein:
the auger has a flighting; and
the flighting makes contact with the periphery of the steel ball.

8. The system of claim 6, wherein:
the metal objects are directed to a location separate from the separated grease directed to the holding tank.

* * * * *